(12) United States Patent
Belwafa et al.

(10) Patent No.: US 10,401,260 B2
(45) Date of Patent: Sep. 3, 2019

(54) FRONTAL OFFSET IMPACT TEST SYSTEM AND METHOD

(71) Applicant: Ford Global Technologies, LLC, Dearborn, MI (US)

(72) Inventors: Jamel E. Belwafa, Ann Arbor, MI (US); Stephen Philip Panoff, Canton, MI (US); David Collino, Monroe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 196 days.

(21) Appl. No.: 15/492,526

(22) Filed: Apr. 20, 2017

(65) Prior Publication Data

US 2018/0306675 A1    Oct. 25, 2018

(51) Int. Cl.
*G01M 17/007*    (2006.01)

(52) U.S. Cl.
CPC .............................. *G01M 17/0078* (2013.01)

(58) Field of Classification Search
None
See application file for complete search history.

(56) References Cited

U.S. PATENT DOCUMENTS

| | | | | |
|---|---|---|---|---|
| 5,861,544 A * | 1/1999 | Kosaraju | ........... | G01M 17/0078 73/12.04 |
| 6,997,036 B2 * | 2/2006 | Kojima | ............ | G01M 17/0078 73/12.09 |
| 7,836,749 B2 * | 11/2010 | Chen | ................ | G01M 17/0078 73/12.04 |
| 8,365,618 B2 | 2/2013 | Kruse | | |
| 9,234,819 B2 * | 1/2016 | Zecha | ................ | G01M 17/007 |
| 9,976,935 B2 * | 5/2018 | Belwafa | ............ | G01M 17/0078 |
| 2011/0192241 A1 * | 8/2011 | Aiki | .................. | G01M 17/0078 73/865.3 |
| 2015/0089995 A1 * | 4/2015 | Lilley | ............... | G01M 17/0078 73/12.07 |
| 2017/0184473 A1 * | 6/2017 | Liu | ....................... | G01M 17/08 |

FOREIGN PATENT DOCUMENTS

| | | |
|---|---|---|
| CN | 203587309 U | 5/2014 |
| DE | 102008022546 A1 | 11/2009 |
| DE | 102008030208 A1 | 12/2009 |
| JP | 3381430 B2 | 12/2002 |
| JP | 2004132777 A | 4/2004 |
| JP | 3711980 B2 | 8/2005 |

* cited by examiner

*Primary Examiner* — Peter J Macchiarolo
*Assistant Examiner* — Jermaine L Jenkins
(74) *Attorney, Agent, or Firm* — Frank A. MacKenzie; Bejin Bieneman PLC

(57) ABSTRACT

A system for testing an impact of a vehicle includes a rail, a cable moveable along the rail, a shuttle fixed to the cable and slideably coupled to the rail, and a cart. The cart includes a connector horizontally spaced from the rail and a centerline parallel to and horizontally spaced from the rail. An arm is fixed to the shuttle and extends from the shuttle to the connector. The arm is releasably connectable to the connector.

20 Claims, 10 Drawing Sheets

FRONTAL OFFSET IMPACT TEST SYSTEM AND METHOD

BACKGROUND

Agencies such as the Insurance Institute for Highway Safety ("IIHS"), the National Highway Traffic Safety Administration ("NHTSA"), and the European New Car Assessment Program (NCAP) investigate vehicle crashworthiness under a variety of impact conditions. For example, IIHS, NHTSA, and NCAP test a crashworthiness of a vehicle and a moving deformable barrier ("MDB") in an offset frontal impact, e.g., moderate overlap frontal, small overlap frontal, etc. In these tests, the test vehicle and the MDB may be offset from each other, i.e., offset in the direction of travel, and impacted with each other in a frontal impact.

DETAILED DESCRIPTION

Figure 1:
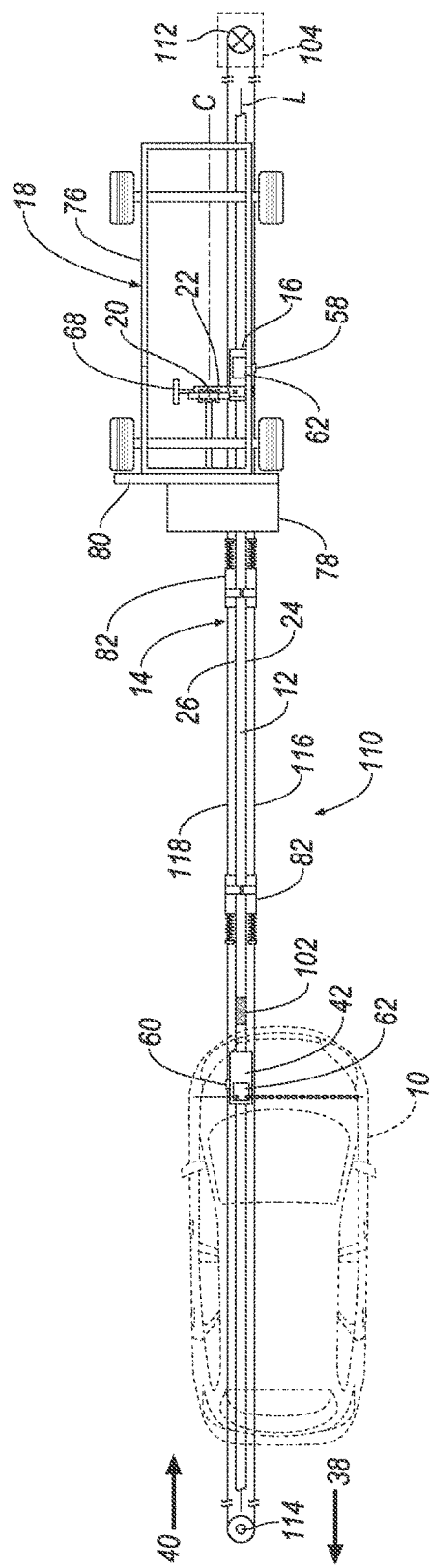
FIG. 1 a top view of a system including a cart connected to a first shuttle and a vehicle connected to a second shuttle.

A system 110 for testing an impact of a vehicle 10 includes a rail 12, a cable 14 moveable along the rail 12, a shuttle 16 fixed to the cable 14 and slideably coupled to the rail 12, and a cart 18. The cart 18 includes a connector 20 horizontally spaced from the rail 12 and a centerline C parallel to and horizontally spaced from the rail 12. An arm 22 is fixed to the first shuttle 16 and extends from the first shuttle 16 to the connector 20. The arm 22 is releasably connectable to the connector 20.

The cable 14 may be a continuous loop. The rail 12 may be elongated along a longitudinal axis L and may include a first side 24 and a second side 26 opposing each other about the longitudinal axis L. The cable 14 may be moveable along the first side 24 in a first direction 38 and along the second side 26 in a second direction 40 opposite the first direction 38. One of the connector 20 and the arm 22 may include a pin 72, and the other of the connector 20 and the arm 22 may include a socket 74, and the pin 72 may be releasably connectable to the socket 74. The socket 74 may be pivotally connected to the other of the connector 20 and the arm 22. The connector 20 may be on the centerline C. The arm 22 may include a wheel 68 and an end 70, and the end 70 may be distal to the shuttle 16, and the wheel 68 may be attached to the end 70. The arm 22 may be configured to pull the cart 18. The arm 22 may be removeably mounted to the shuttle 16. The system 110 may include a shock absorber 82 removeably mounted to the rail 12. The shock absorber 82 may be positioned relative to the rail 12 to be impacted by the first shuttle 16 as the first shuttle 16 slides along the rail 12. The shock absorber 82 may include a bracket 84 adjacent the rail 12, and the shock absorber 82 may include a fastener 86 removeably mounting the bracket 84 to the rail 12. The shock absorber 82 may include a dashpot 98 elongated along the rail 12. The shock absorber 82 may be a honeycomb structure 100. The system 110 may include a second shuttle 42 fixed to the cable 14 and slideably coupled to the rail 12, the shuttle 16 and the second shuttle 42 being slideable along the rail 12 in a direction toward each other. The second shuttle 42 may be connected to a vehicle 10. The system 110 may include a ramp 102 mounted on the rail 12, and the second shuttle 42 may be slideably disconnected from the vehicle 10 on the ramp 102.

A method includes connecting the cart 18 to a first section 116 of the cable 14 with a centerline of the cart 18 offset from a centerline of the vehicle 10. The first section 116 and the second section 118 are on opposite sides of a pulley 114 and are parallel to the centerlines of the vehicle 10 and cart 18. The method includes connecting the vehicle 10 to the second section 118 of the cable 14. The method includes pulling the cable 14 about the pulley 114 to impact the vehicle 10 and the cart 18 while centerlines are offset.

The cable 14 may extend about a motor 112 with the first section 116 and the second section 118 on opposite sides of the motor 112, and the method may include turning the motor 112 to pull the cable 14 about the pulley 114. The method may include releasing the vehicle 10 from the cable 14 prior to impacting the vehicle 10 and the cart 18.

Figure 2:
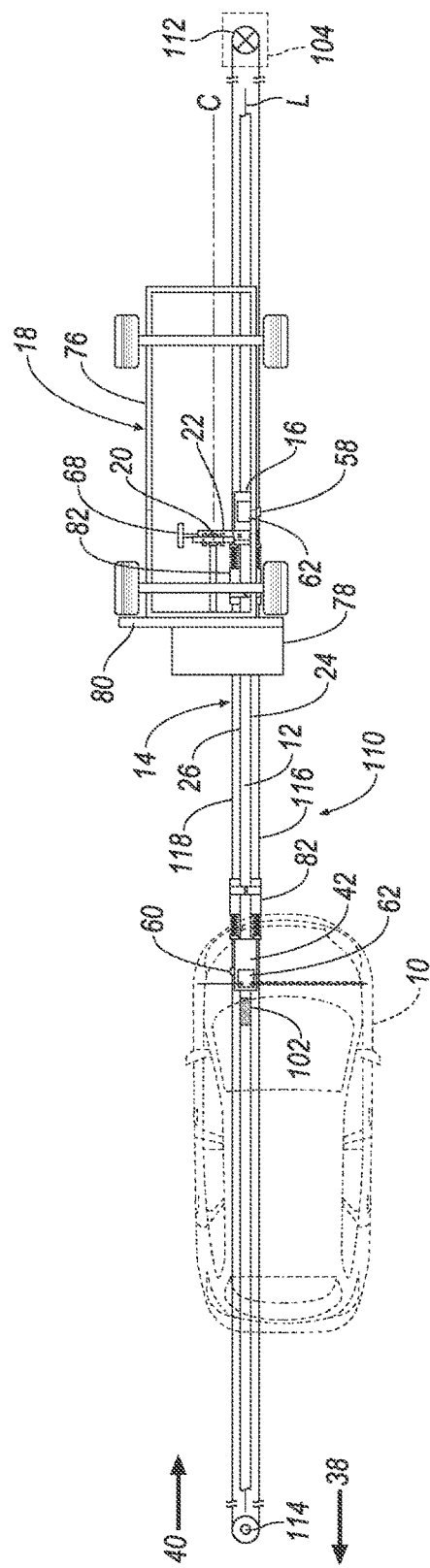
FIG. 2 is a top view of the cart releasing from the first shuttle and the vehicle releasing from the second shuttle.
Figure 3:
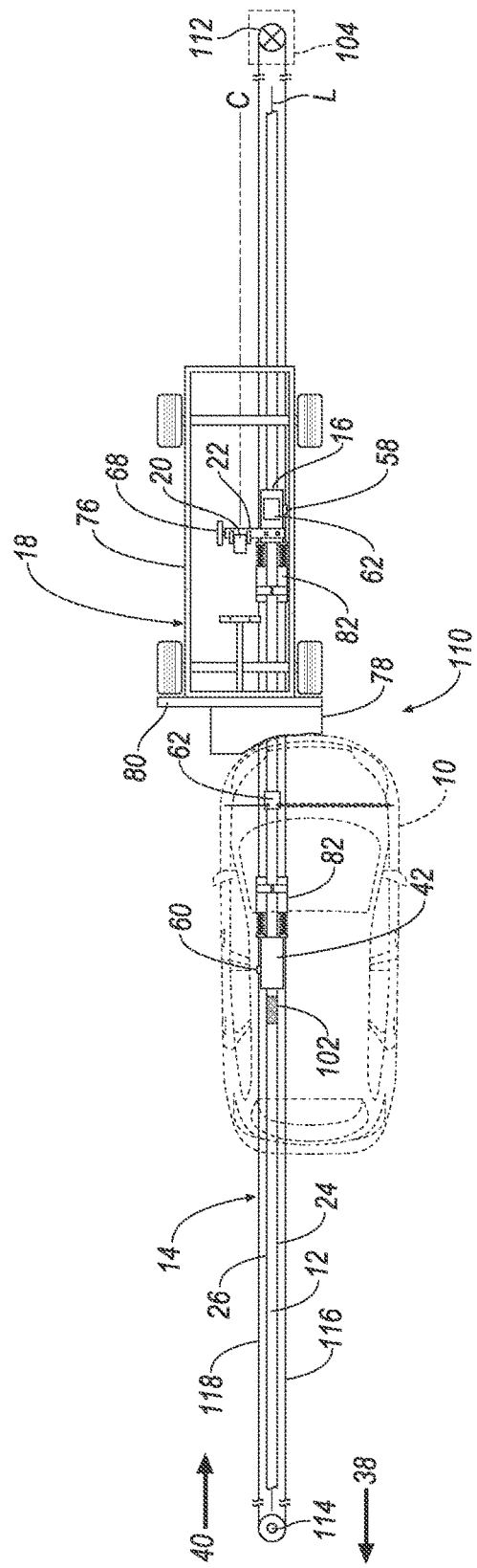
FIG. 3 is a top view of an offset frontal impact test including the vehicle and the cart.

With reference to the Figures, wherein like numerals indicate like parts throughout the several views, the system 110 and method are generally shown. With reference to FIGS. 1-3, the system 110 moves the vehicle 10 and the cart 18 toward each other to an offset frontal impact test. The vehicle 10 and the cart 18 are in an initial position in FIG. 1, in which the vehicle 10 and the cart 18 are stationary and spaced from each other. FIG. 2 shows the vehicle 10 and the cart 18 moving along the rail 12 toward each other. FIG. 3 shows the vehicle 10 and the cart 18 in an impact position. Specifically, as the cable 14 moves along the rail 12, the shuttle 16 (hereinafter referred to as "first shuttle 16") slides on the rail 12 in a direction toward the cart 18. Similarly, as set forth further below, the cable 14 pulls the vehicle 10 toward the cart 18. The arm 22 is connected to the connector 20 and pulls the cart 18 along the centerline C. Specifically, since the connector 20 is horizontally spaced from the rail 12, and the arm 22 extends to the connector 20, the arm 22 may pull the cart 18 along the centerline C, which is horizontally spaced from the rail 12. Accordingly, the arm 22 may pull the cart 18 along the rail 12 in the offset frontal impact test, as set forth further below.

With continued reference to FIGS. 1-3, the rail 12 is elongated along the longitudinal axis L. The rail 12 may include the first side 24 and the second side 26 opposing each other about the longitudinal axis L. The rail 12 may, for example, be disposed in a trough 28 that is recessed into a floor 30 designed to provide a stable and level surface for the rail 12. The rail 12 may be constructed from any suitable material such as iron, steel, etc. The rail 12 may be any suitable type such as a bullhead rail, a grooved rail, a flat-bottomed rail, etc.

Figure 4:
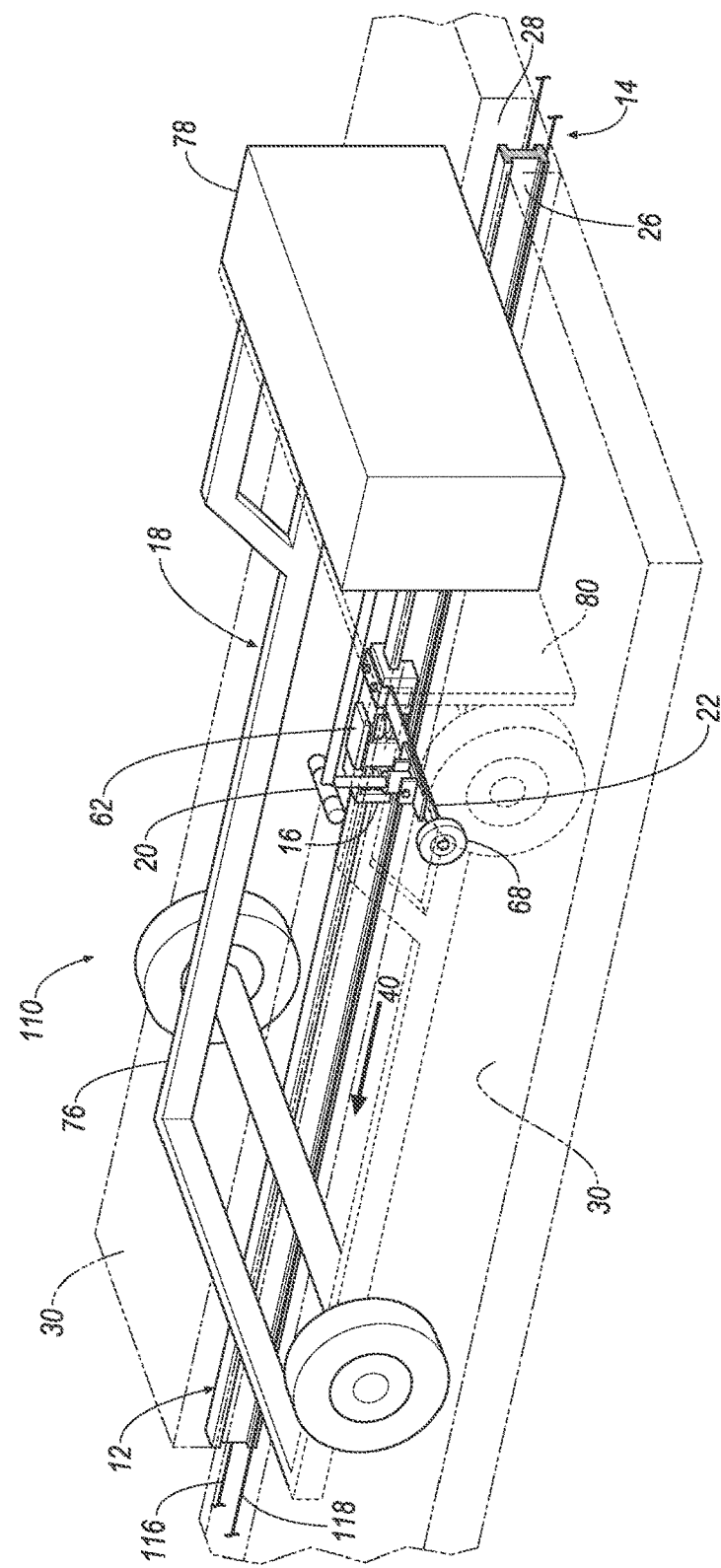
FIG. 4 is a perspective view of the cart having a connector horizontally spaced from a rail and an arm releasably connectable to the connector.

As shown in FIGS. 4, 5, and 7, the rail 12 may include a head 32, a foot 34, and a webbing 36 that connects the head 32 to the foot 34. The rail 12 may have a cross-sectional profile in the shape of an I-beam. The cross-sectional profile may, for example, be an asymmetrical shape, i.e., the head 32 and foot 34 have a different shape. The head 32, foot 34, and webbing 36 may be unitary and extend along the longitudinal axis L of the rail 12, i.e. along the first side 24 and the second side 26. The head 32 may be supported by the foot 34 and the webbing 36. Specifically, the foot 34 may have a flat bottom designed to mount to the floor 30 in the trough 28 to provide support for the head 32. The head 32 may, for example, be smooth, durable, and designed to resist wear.

With reference to FIGS. 1-6, the cable 14 is moveable along the rail 12. Specifically, the cable 14 may be moveable along the first side 24 in the first direction 38 and along the second side 26 in the second direction 40 opposite the first direction 38. The first direction 38 and the second direction 40 are parallel to the rail 12. The cable 14 may be the continuous loop, as shown in FIGS. 1-3. In other words, the continuous loop may include a first end (not numbered) and a second end (not numbered) connected to each other. In this example, the cable 14 is driven by a motor 112 and is wrapped around the pulley 114. The first shuttle 16 and the second shuttle 42 are both connected to and propelled relative to the rail 12 by the cable 14. In another example (not shown in the figures), the system 110 may include a first cable connected to the first shuttle 16, and a second cable connected to the second shuttle 42. In this example, the system 110 includes a first motor that drives the first cable, and a second motor that drives the second cable, i.e., the first cable and the second cable are independently moved by separate motors. The first motor may be located at the position of the motor 112 shown in FIG. 1, and the second motor may be located at the position of the pulley 114 shown in FIG. 1.

As shown in FIGS. 1-3, the cable 14 may include the first section 116 connected to the first shuttle 16 and the second section 118 connected to the second shuttle 42. The first section 116 is on the first side 24 of the rail 12, and the second section 18 is on the second side 26 of the rail 12, i.e., the first section 116 and the second section 118 are on opposite sides of the rail 12. Accordingly, when the cable 14 is moved relative to the rail 12, the first section 116 and the second section 118 move in opposite directions.

The cable 14 may, for example, include several strands of wire that are bonded, twisted, and/or braided together into the shape of a helix. The cable 14 may be designed to have a high tensile strength for transferring heavy loads, e.g., vehicle 10, along the rail 12. The cable 14 may be made of any suitable material such as steel, etc.

Figure 5A:
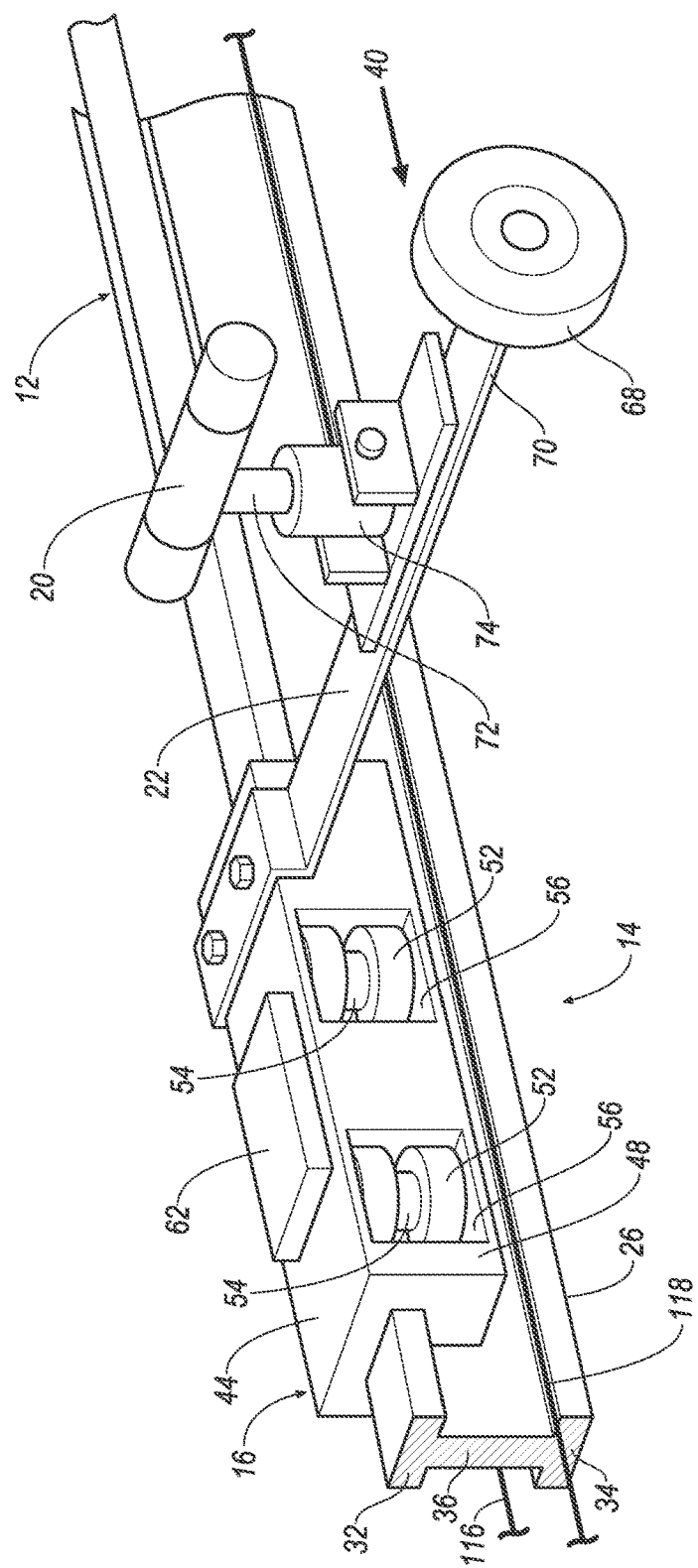
FIG. 5A is a perspective view of the first shuttle slideably coupled to the rail and the arm connected to the connector.
Figure 5B:
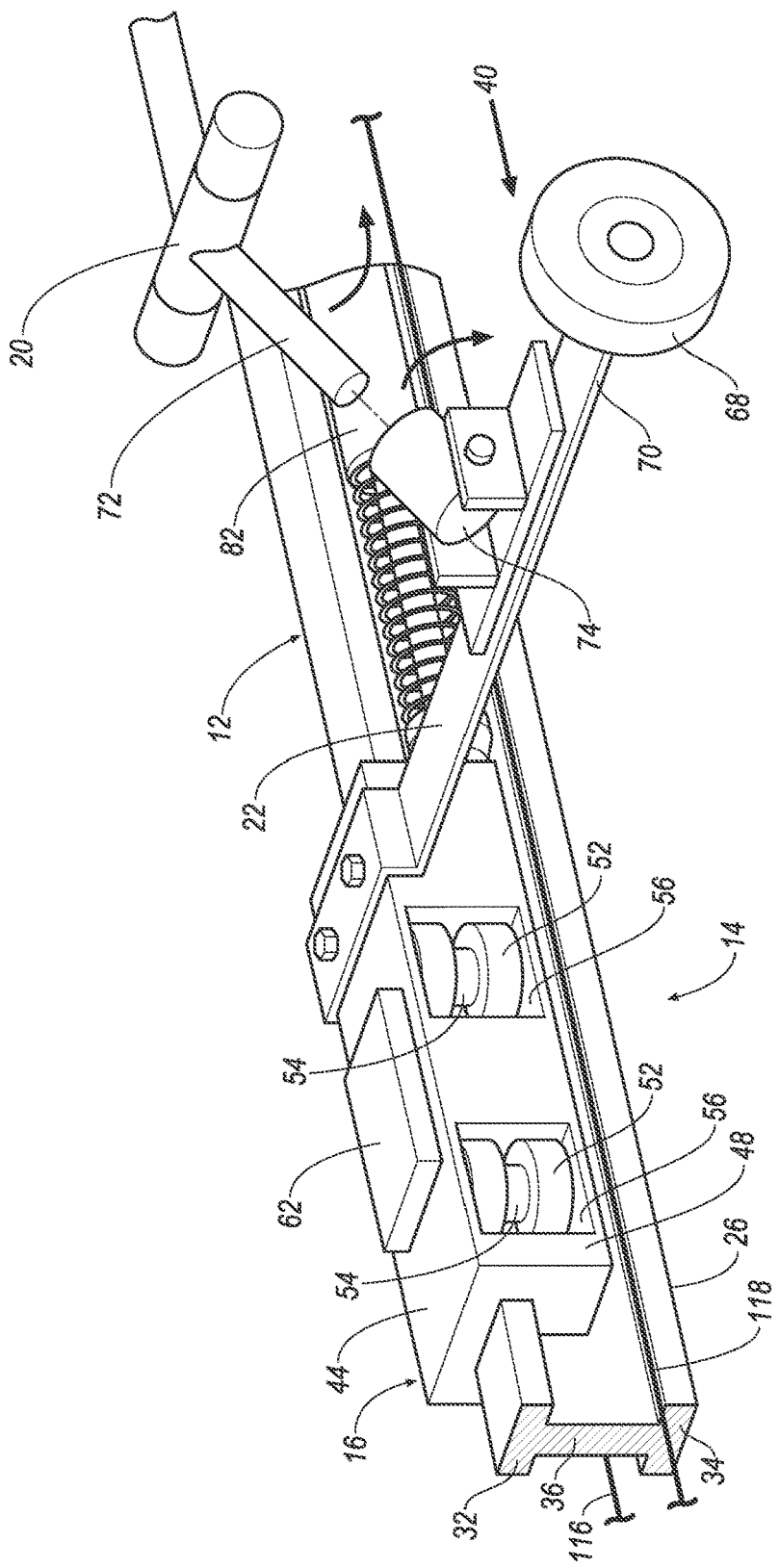
FIG. 5B is the perspective view of FIG. 5A with the connecter released from the arm.
Figure 6:
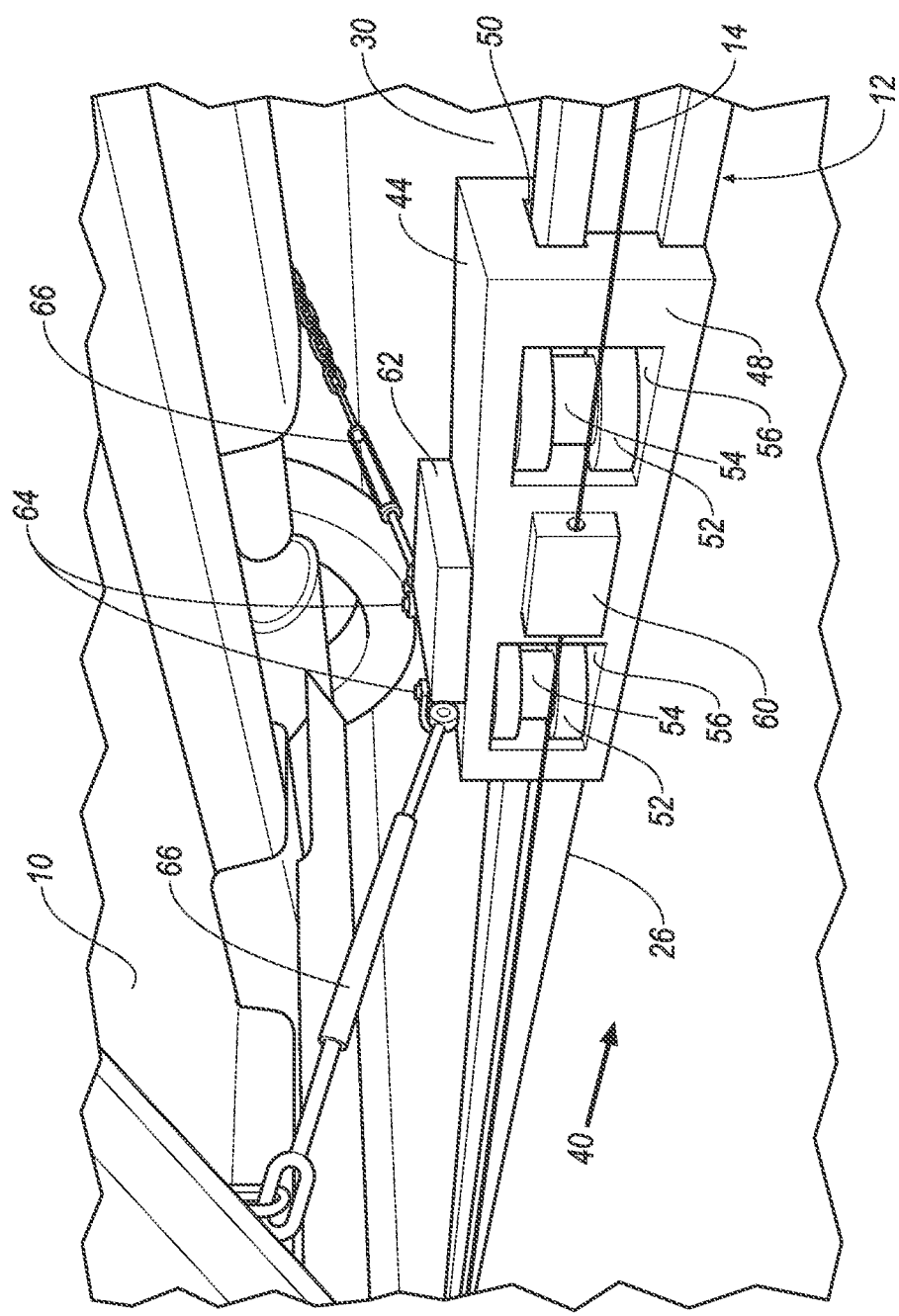
FIG. 6 is a perspective view of the second shuttle fixed to a cable and connected to the vehicle.

The first shuttle 16 is fixed to the cable 14 and slideably coupled to the rail 12. The second shuttle 42 fixed to the cable 14 and slideably coupled to the rail 12. Common numerals are used to identify common features in the first shuttle 16 and the second shuttle 42. As shown in FIGS. 5-6, the first shuttle 16 and the second shuttle 42 may include a top plate 44 adjoined to a first plate 46 and a second plate 48. The first plate 46 and the second plate 48 extend generally perpendicular relative to the top plate 44. The first plate 46 and the second plate 48 are spaced from each other and define a slot 50 configured, e.g., size, shaped, positioned, to house the rail 12. The first shuttle 16 and the second shuttle 42 may, for example, be formed from any suitable material such as steel, aluminum, etc.

The first shuttle 16 and the second shuttle 42 may each include a roller 52 that slideably couples the first shuttle 16 and the second shuttle 42 to the rail 12. Specifically, the roller 52 may couple to the head 32 of the rail 12 to allow the first shuttle 16 and the second shuttle 42 to slide on the rail 12 along the longitudinal axis L. The roller 52 may have a groove 54 that allows the roller 52 to secure to the head 32 and rotate against the rail 12. As shown in FIGS. 4-6, the roller 52 may be disposed in a cutout 56 configured, e.g., size, shaped, positioned, to fit the roller 52. The cutout 56 may, for example, be located on the first plate 46 and the second plate 48. The first shuttle 16 and the second shuttle 42 may include a plurality of rollers, e.g., two rollers on the first plate 46 and two rollers on the second plate 48. The roller 52 allows the first shuttle 16 and the second shuttle 42 to slide on the rail 12 in a smooth and efficient manner.

The first shuttle 16 and the second shuttle 42 may include a first clamp 58 and a second clamp 60, respectively. The first clamp 58 may fix the first shuttle 16 to the cable 14, specifically the first section 116 of the cable 14, to pull the first shuttle 16 along the rail 12. Similarly, the second clamp 60 may fix the second shuttle 42 to the cable 14, specifically the second section 118 of the cable 14, to pull the second shuttle 42 along the rail 12. The first clamp 58 and the second clamp 60 may be designed, e.g., sized, shaped, positioned, to apply a pressure to the cable 14 to prevent the cable 14 from separating from the first shuttle 16 and the second shuttle 42.

The first clamp 58 may, for example, mount on the first plate 46 of the first shuttle 16, and the second clamp 60 may mount on the second plate 48 of the second shuttle 42. The first clamp 58 may fix to the cable 14 and move the first shuttle 16 in the first direction 38 and the second clamp 60 may fix to the cable 14 and move the second shuttle 42 in the second direction 40. In that instance, the first shuttle 16 and the second shuttle 42 slide on the rail 12 in a direction toward each other. The first clamp 58 and the second clamp 60 may be of any suitable type such as a bench clamp, a bar clamp, etc.

The first shuttle 16 and the second shuttle 42 may include an attachment block 62 moveably mounted on the top plate 44. The system 110 includes a tensioning system 66. The tensioning system 66 includes an attachment point 64 that connects the second shuttle 42 to the vehicle 10. The tensioning system 66 may include two attachment points 64. The attachment block 62 of the second shuttle 42 may receive the attachment points 64 between the attachment block 62 and the top plate 44, and may releasably pinch the attachment point 64 between the attachment block 62 and the top plate 44. The attachment point 64 maintains tension between the vehicle 10 and the second shuttle 42. As set forth below, the attachment block 62 of the second shuttle 42 may be raised relative to the top plate 44 to release the attachment point 64, i.e., to un-pinch the attachment point 64, from the second shuttle 42, which releases the vehicle 10 from the second shuttle 42. For example, as set forth below, this release may occur when the second shuttle 42 engages the ramp 102. As shown in FIG. 6, the tensioning system 66 may include components such as a chain, a turnbuckle, an eye-bolt, etc.

As shown in FIGS. 1-5, the arm 22 is fixed to the first shuttle 16. The arm 22 extends from the first shuttle 16 to the connector 20. For example, the arm 22 may extend from the first shuttle 16 generally perpendicular to the longitudinal axis L. The arm 22 may be mounted to the top plate 44 of the first shuttle 16 and extend away from the first shuttle 16 toward the centerline C. The cable 14 moves along the rail 12 underneath the arm 22, i.e., between the arm 22 and the trough 28. Specifically, the cable 14 moves along the rail 12 in the second direction 40 between the arm 22 and the trough 28. The arm 22 connects to the connector 20 as the cart 18 moves along the centerline C, as shown in FIG. 1, and releases from the connector 20 as the cart 18 approaches the impact position, as shown in FIG. 2. The arm 22 provides the desired offset for the cart 18 relative to the rail 12.

The arm 22 may be removeably mounted to the first shuttle 16. For example, the arm 22 may be bolted to the first shuttle 16, as shown in FIGS. 1-5. The arm may be configured to interchangeably fix to the first shuttle 16, i.e., extend to either side of the first shuttle 16. The arm 22 may be designed, e.g., sized, shaped, positioned, to withstand a force from an object, e.g., the cart, when the arm 22 is pulling the cart 18 along the centerline C. The arm 22 may be rigid relative to the first shuttle 16 and manufactured from any suitable material, e.g., steel, aluminum, etc.

With continued reference to FIGS. 1-5, the arm 22 may include the wheel 68 attached to the end 70 distal to the first shuttle 16. The wheel 68 may, for example, travel along a path that is parallel to the centerline C. The wheel 68 may be attached to the end 70 in any suitable manner such as a shaft, a bearing, a clip, etc. The wheel 68 may be designed, e.g., sized, shaped, positioned, to provide stability to the arm 22 when the arm 22 is connected to the connector 20 and the first shuttle 16 slides on the rail 12.

With reference to FIGS. 1-3, the centerline C of the cart 18 is parallel to and horizontally spaced from the rail 12. In other words, the centerline C may be parallel to the longitudinal axis L and spaced from the rail 12. The centerline C may, for example, be along the center of gravity of the chassis 76. As stated above, the arm 22 moves the connector 20 along the centerline C, as shown in FIG. 1, and releases the arm 22 from the connector 20, as shown in FIG. 2. In that instance, the cart 18 may move independently along the centerline C toward the impact position.

The cart 18 includes the connector 20 horizontally spaced from the rail 12. As shown in FIGS. 1-3, the connector 20 may be on the centerline C. One of the connector 20 and the arm 22 may be a pin 72, and the other of the connector 20 and the arm 22 may be a socket 74. The pin 72 may releasably connect to the socket 74. In other words, the pin 72 and the socket 74 may be connected to each other, as shown in FIG. 5A, and may release from each other, as shown in FIG. 5B. The socket 74 may, for example, pivotally connect to the other of the connector 20 and the arm 22. The pin 72 and the socket 74 may be designed, e.g., sized, shaped, positioned, to move the cart 18 along the centerline C toward the impact position.

The cart 18 may include a chassis 76 that supports components of the cart 18, e.g., a front bumper, wheels, etc. The chassis 76 may be designed to carry a load of the cart 18 as well as other components such as sensors, cables, etc. The chassis 76 may be rigid and designed to withstand an impact with another object, e.g., vehicle 10, without the chassis deforming upon the impact. The connector 20 may, for example, be integrated into the design of the chassis 76. The chassis 76 may be constructed of any suitable material such as steel, aluminum, etc.

The cart 18, e.g., a moving deformable barrier, may include a deformable energy absorption block 78 that is attached to the chassis 76. The deformable energy absorption block 78 may be designed, e.g., sized, shaped, positioned, to absorb a force from an impact with another object, e.g., vehicle 10. The deformable energy absorption block 78 may, for example, attach to a back plate 80 that is supported by the chassis 76. The deformable energy absorption block 78 may be attached to the back plate 80 in any suitable manner, e.g., adhesive, bolt, clamp, etc. The deformable energy absorption block 78 may be constructed from a combination of materials such as honeycomb, aluminum, etc. The deformable energy absorption block 78 maybe designed to provide precise and accurate measurements that ensure repetitive and correlative results in an offset frontal impact between the cart 18 and the vehicle 10. With reference to FIGS. 1-3, 5B, and 7A-B, the system 110 may include the shock absorber 82 removeably mounted to the rail 12. The shock absorber 82 may, for example, be positioned relative to the rail 12 to be impacted by the first shuttle 16 and/or the second shuttle 42 as the first shuttle 16 and/or the second shuttle 42 slide along the rail 12. The shock absorber 82 may be designed to dampen impulses in any suitable manner, e.g., mechanically, electrically, pneumatically, hydraulically, etc. The shock absorber 82 may, for example, prevent the first shuttle 16 from impacting the second shuttle 42 when the first shuttle 16 and the second shuttle 42 slide on the rail 12 in a direction toward each other.

Figure 7A:
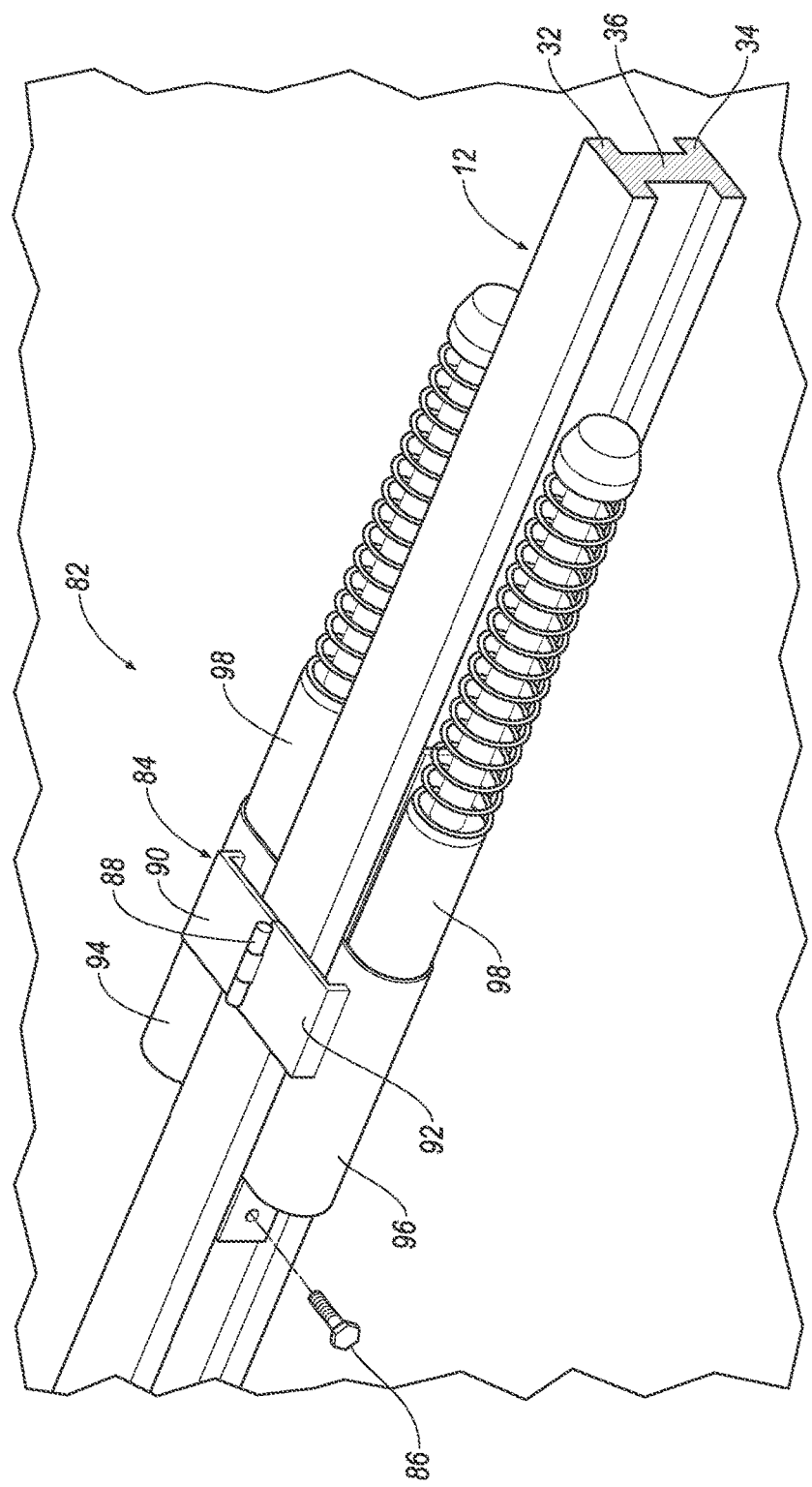
FIG. 7A is a perspective view of one embodiment of a shock absorber including a dashpot.
Figure 7B:
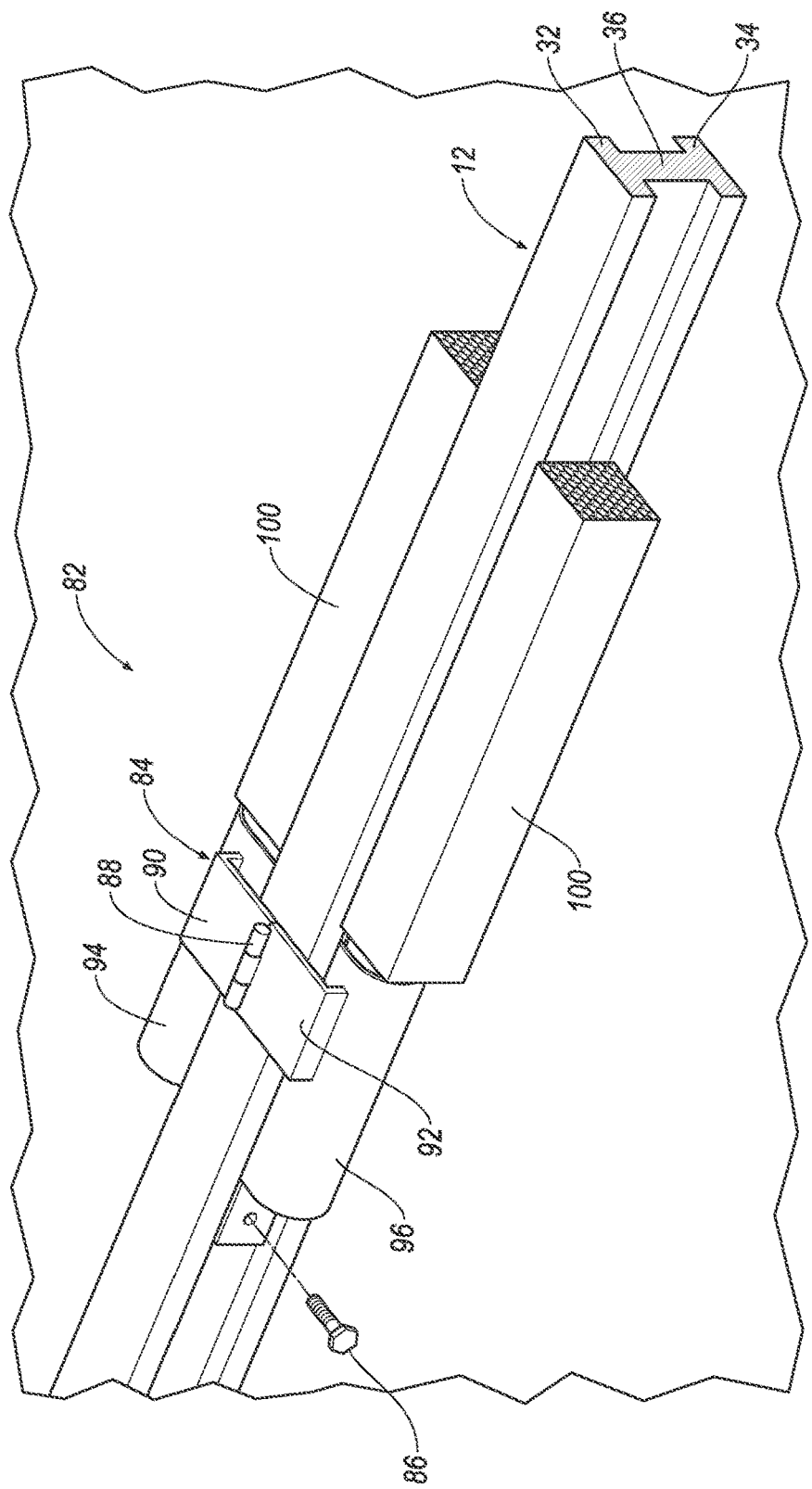
FIG. 7B is a perspective view of another embodiment of the shock absorber including a honeycomb structure.

The shock absorber 82 may include the bracket 84 adjacent to the rail 12 and the fastener 86 that removeably mounts the bracket 84 to the rail 12. As shown in FIGS. 7A-B, the bracket 84 may include a hinge 88 coupling a first support 90 to a second support 92. The hinge 88 may be disposed on the head 32 of the rail 12. The hinge 88 allows the first support 90 and the second support 92 to removably mount to the rail 12. The first support 90 and the second support 92 extend from the hinge 88 around the head 32 of the rail 12 to the webbing 36. The first support 90 and the second support 92 extend longitudinally along the webbing 36 to mount the first support 90 and the second support 92 to the webbing 36. The fastener 86 allows the bracket 84 to be positioned at various points along the rail 12. The fastener 86 may, for example, be a bolt, screw, etc. As shown in FIGS. 7A-B, the bracket 84 may include a first chamber 94 attached to the first support 90 and a second chamber 96 attached to the second support 92.

The shock absorber 82 may include the dashpot 98 elongated along the rail 12. The dashpot 98 may, for example, compress and decompress upon impact with the first shuttle 16 and/or the second shuttle 42. The dashpot 98 may include components such as a plunger engageable with a chamber, and a cushion, a spring, etc. in the chamber. The dashpot 98 may be disposed in the first chamber 94 and/or the second chamber 96. The dashpot 98 may be longitudinally adjacent to the rail 12 relative to the longitudinal axis L. The dashpot 98 may be configured, e.g., sized, shaped, positioned, to dissipate kinetic energy arising from an impact with the first shuttle 16 and/or the second shuttle 42.

As another example, the shock absorber 82 may be the honeycomb structure 100. The honeycomb structure 100 may be longitudinally adjacent to the rail 12 relative to the longitudinal axis L. The honeycomb structure 100 may, for example, include cells that are columnar and hexagonal in shape. The honeycomb structure 100 may be made from materials such as aluminum, fiberglass, and fiber-reinforce plastics, etc. The honeycomb structure 100 may be constructed with high out-of-plane compression and shear properties to dissipate kinetic energy arising from an impact with the first shuttle 16 and/or the second shuttle 42.

The system 110 may include the ramp 102 mounted on the rail 12. Specifically, the ramp may be mounted on the head 32 of the rail 12. The ramp 102 may, for example, incline away from the head 32 of the rail 12 to a ramp plane (not shown) and then decline from the ramp plane back to the head 32 of the rail 12. The ramp 102 may disconnect the second shuttle 42 from the vehicle 10 as the second shuttle 42 slides over the ramp 102. For example, the second shuttle 42 may include a mechanism, e.g., a trigger, releasable pin, cam, etc., that is configured to be triggered by the ramp 102 to raise the attachment block 62 relative to the top surface 44 of the second shuttle 42 and allow the attachment point 64 to release from the attachment block 62 as the second shuttle 42 slides over the ramp 102. When the attachment point 64 is released from the attachment block 62, the vehicle 10 moves independently of the second shuttle 42 along the rail 12 toward the impact position, as shown in FIGS. 2-3. The ramp 102 may be positioned at various locations along the rail 12.

The system 110 may include a drive system 104 designed to move the cable 14 along the rail 12. Specifically, the drive system 104 may be configured to move a first section of the cable 14 along the first side 24 in the first direction 38 and a second section of the cable 14 along the second side 26 in the second direction 40. The drive system 104 transfers electrical power into mechanical power to allow the cable 14 to move an object, e.g., the cart 18 and/or the vehicle 10, along the rail 12.

The drive system 104 may include the motor 112 and a drive (not shown). The motor 112 may be powered by either a direct current or an alternating current that generates a rotational force onto a shaft of the motor 112. The drive may be configured, e.g., sized, shaped, positioned, to control the speed and torque of the motor 112 by varying the frequency and/or voltage applied to the motor 112. The motor 112 and the drive are configured to control the acceleration and velocity of the cable 14.

The drive system 104 may include the pulley 114 coupled to the motor 112, e.g., a shaft, and attached to the cable 14. The pulley 114 may include a channel (not shown) for holding the cable 14 onto the pulley 114. The cable 14 extends around the pulley 114 and/or the shaft of the motor 112. The drive system 104 may include a plurality of pulleys configured, e.g., sized, shaped, positioned, to move the cable 14. The pulley 114 may be configured to move the first section of the cable 14 along the first side 24 in the first direction 38 and the second section of the cable 14 along the second side 26 in the second direction 40. The pulley 114 allows the cable 14 to move freely within the channel thus minimizing wear and abrasion on the cable 14.

The system 110 may include a control system (not shown) having a controller (not shown) in communication with the drive system 104. The control stem may include several types of control systems and associated instrumentation including SCADA systems, DCS, and programmable logic controllers (PLCs). The control system 110 may be designed for multiple arrangements of digital and analog inputs and outputs to control the acceleration and velocity of the cable 14 as it moves along the rail 12.

The controller may be a microprocessor-based controller. The controller may include a processor, memory, etc. The memory of the controller may store instructions executable by the controller.

The control system 110 may transmit signals through a communications network (such as a controller area network (CAN) bus), Ethernet, and/or by any other wired or wireless communication network. The controller and the drive system 104 may communicate through the communications network.

During an offset frontal impact test, the vehicle 10 and the cart 18 may be spaced from each other along the rail 12, as shown in FIGS. 1-3. In such instance, the vehicle 10 may be connected to the second shuttle 42, i.e., the tensioning system 66 couples the vehicle 10 to the attachment block 62. The vehicle 10 is configured to move along the longitudinal axis L of the rail 12 toward the impact position. The cart 18 may be configured to move along the centerline C. The cart 18 includes the connector 20 that is horizontally spaced from the rail 12 and releasably connects to the arm 22. The arm 22 is fixed to the first shuttle 16. The first shuttle 16 fixes to the first section of the cable 14 and the second shuttle 42 fixes to the second section of the cable 14.

As the drive system 104 moves the cable 14 along the rail 12, the first shuttle 16 slides in the first direction 38 and the second shuttle 42 slides in the second direction 40, i.e., the first shuttle 16 and the second shuttle 42 slide on the rail 12 toward each other. As the second shuttle 42 slides on the ramp 102, the second shuttle 42 disconnects from the vehicle 10 and the vehicle 10 moves independently in the second direction 42 toward the impact position, as shown in FIG. 2. As the first shuttle 16 impacts the shock absorber 82, the arm 22 releases from the connecter 20 and cart 18 moves independently along centerline C toward the impact position. The vehicle 10 and the cart 18 collide with each other with an offset in the impact position, as shown in FIG. 3. The configuration of the system 110 allows for the offset impact to be performed using a single rail and a single cable.

Figure 8:
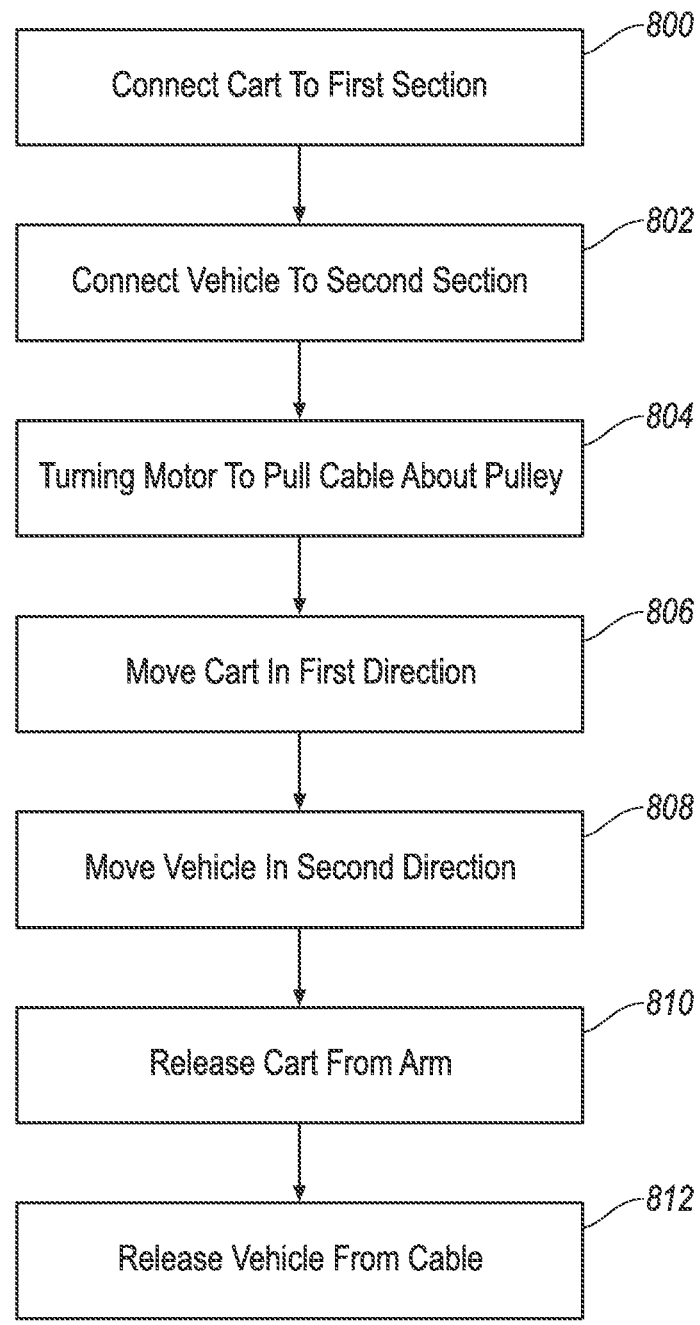
FIG. 8 is a block diagram of a process for the offset frontal impact test.

FIG. 8 illustrates the method of impacting the vehicle 10 and the cart 18 in an offset frontal impact. In block 800, the method includes connecting the cart 18 to the first section 116 of the cable 14. Specifically, the first clamp 58 on the first plate 46 of first shuttle 16 is connected to the first section 116 of the cable 14, and the first shuttle 16 is connected to cart 18. In particular, the pin 72 of the connector 20 is inserted into the socket 74 of the first shuttle 16.

In block 802, the method includes connecting the vehicle 10 to the second section 118 of the cable 14. Specifically, the second clamp 60 on the second plate 48 of the second shuttle 42 is connected to the second section 118 of the cable 14, and the second shuttle 42 is connected to the vehicle 10 with the tensioning system 66.

In block 804, the method includes turning the motor 112 to pull the cable 14 about the pulley 114. Specifically, as set forth above, the cable 14 extends about the motor 112 with the first section 116 and the second section 118 on opposite sides of the motor 112. The pulley 114 moves the first section 116 of the cable 14 along the first side 24 of the rail 12 in the first direction 38, and moves the second section 118 of the cable 14 along the second side 26 of the rail 12 in the second direction 40. Specifically, the first section 116 of the cable 14 moves the cart 18 in the first direction 38 and the second section 118 of the cable 14 moves the vehicle 10 in the second direction 40. The acceleration and velocity of the vehicle 10 and the cart 18 is synchronously controlled using the single cable 14 moving along the single rail 12.

In block 806, the method includes moving the cart 18 in the first direction 38. As the cable 14 moves along the rail 12 in the first direction 38, the first shuttle 16 slides on the rail 12 toward the impact position. The arm 22 fixed to the first shuttle 16 connects to the connector 20 and moves the cart 18 along the centerline C toward the impact position, as shown in FIGS. 1-2.

In block 808, the method includes moving the vehicle 10 in the second direction 40. As the cable 14 moves along the rail 12 in the second direction 40, the second shuttle 42 slides on the rail 12 toward the impact position, as shown in FIGS. 1-2. The attachment block 62 mounted on the top plate 44 of the second shuttle 42 connects the second shuttle 42 to the vehicle 10. Since the cable 14 is continuous, the steps of moving the cart 18 in the first direction 38 and moving the vehicle in the second direction 40 occur at the same time as the motor 112 is turned.

In block 810, the method includes releasing the cart 18 from the arm 22. Specifically, the first shuttle 16 is impacted against the shock absorber 82. As shown in FIG. 2, this results in the connector 20 releasing from the arm 22 thus allowing the cart 18 to continue to move along the centerline C. For example, the pin 72 on the connector 20 releases from the socket 74 on the arm 22 to allow the connector 20 to release from the arm 22 and the cart 18 to move toward the impact position.

In block 812, the method includes releasing the vehicle 10 from the cable 14 prior to impacting the cart 18. Specifically, the second shuttle 42 slides on the ramp 102 and releases the attachment block 62 from the top plate 44 of the second shuttle 42 thus allowing the vehicle 10 to move toward the impact position. In particular, as set forth above, as the second shuttle 42 slides on the ramp 102, the mechanism in the second shuttle 42 is triggered by the ramp 102 to raise the attachment block 62 relative to the top surface 44 of the second shuttle 42 and allow the attachment point 64 to release from the attachment block 62 as the second shuttle 42 slides over the ramp 102.

As stated above, the method includes impacting the vehicle 10 and the cart 18 in the offset frontal impact test. After releasing from the first shuttle 16 and the second shuttle 42, the cart 18 and the vehicle 10, respectively, move along the rail 12 in a direction toward each other to the impact position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
   a rail;
   a cable moveable along the rail;
   a shuttle fixed to the cable and slideably coupled to the rail;
   a cart having a connector horizontally spaced from the rail and a centerline parallel to and horizontally spaced from the rail; and
   an arm fixed to the shuttle and extending from the shuttle to the connector, the arm being releasably connectable to the connector;
   wherein the rail is elongated along a longitudinal axis and includes a first side and a second side opposing each other about the longitudinal axis, the cable being moveable along the first side in a first direction and along the second side in a second direction opposite the first direction.

2. The system of claim 1, wherein the cable is a continuous loop.

3. The system of claim 1, wherein one of the connector and the arm includes a pin, and the other of the connector and the arm includes a socket, the pin being releasably connectable to the socket.

4. The system of claim 3, wherein the socket is pivotally connected to the other of the connector and the arm.

5. The system of claim 1, wherein the connector is on the centerline.

6. The system of claim 1, wherein the arm includes a wheel and an end, the end being distal to the shuttle and the wheel being attached to the end.

7. The system of claim 1, wherein the arm is configured to pull the cart.

8. The system of claim 1, wherein the arm is removeably mounted to the shuttle.

9. The system of claim 1, further comprising a shock absorber removeably mounted to the rail.

10. The system of claim 9, wherein the shock absorber is positioned relative to the rail to be impacted by the shuttle as the shuttle slides along the rail.

11. The system of claim 9, wherein the shock absorber includes a bracket adjacent the rail, and a fastener removeably mounting the bracket to the rail.

12. The system of claim 9, wherein the shock absorber includes a dashpot elongated along the rail.

13. The system of claim 9, wherein the shock absorber is a honeycomb structure.

14. The system of claim 1, further comprising a second shuttle fixed to the cable and slideably coupled to the rail, the shuttle and the second shuttle slideable along the rail in a direction toward each other.

15. The system of claim 14, wherein the second shuttle is connected to a vehicle.

16. The system of claim 15, further comprising a ramp mounted on the rail, wherein the second shuttle is configured to slideably engage the ramp to disconnect from the vehicle on the ramp.

17. A method, comprising:
   connecting a cart to a first section of a cable with a centerline of the cart offset from a centerline of a vehicle, the first section and a second section being on opposite sides of a pulley and parallel to the centerlines of the vehicle and cart;
   connecting the vehicle to the second section of the cable; and
   pulling the cable about the pulley to impact the vehicle and the cart while centerlines are offset.

18. The method as set forth in claim 17, wherein the cable extends about a motor with the first and second sections on opposite sides of the motor, further comprising turning the motor to pull the cable about the pulley.

19. The method as set forth in claim 17, further comprising releasing the vehicle from the cable prior to impacting the vehicle and the cart.

20. A system, comprising:
   a rail;
   a cable moveable along the rail;
   a shuttle fixed to the cable and slideably coupled to the rail;
   a cart having a connector horizontally spaced from the rail and a centerline parallel to and horizontally spaced from the rail;
   an arm fixed to the shuttle and extending from the shuttle to the connector, the arm being releasably connectable to the connector; and
   a second shuttle fixed to the cable and slideably coupled to the rail, the shuttle and the second shuttle slideable along the rail in a direction toward each other.

* * * * *